United States Patent [19]
Carr

[11] 3,757,843
[45] Sept. 11, 1973

[54] BELTED PNEUMATIC TIRE

[75] Inventor: Robert L. Carr, Akron, Ohio

[73] Assignee: The B. F. Goodrich Company, New York, N.Y.

[22] Filed: Apr. 23, 1971

[21] Appl. No.: 136,896

[52] U.S. Cl. .................... 152/361 DM, 152/361 FP
[51] Int. Cl. ............................................. B60c 9/20
[58] Field of Search ................................... 152/361

[56] References Cited
UNITED STATES PATENTS

| 3,637,003 | 1/1972 | Clapson | 152/361 |
|---|---|---|---|
| 3,126,042 | 3/1964 | Cegnar | 152/361 |
| 3,643,723 | 2/1972 | Mukai et al. | 152/361 |
| 3,404,721 | 10/1968 | Massoubre | 152/361 |
| 3,656,533 | 4/1972 | Barassi et al. | 152/361 |

FOREIGN PATENTS OR APPLICATIONS

| 1,163,817 | 9/1969 | Great Britain | 152/361 |

Primary Examiner—Gerald M. Forlenza
Assistant Examiner—George H. Libman
Attorney—William A. Shira, Jr.

[57] ABSTRACT

A pneumatic tire such as a radial cord tire has a constricting peripheral belt under the tread containing plies of cords at small angles to the central plane of the tire, with a central ply, preferably narrower than the other, containing cords of a higher modulus than those of the plies above and below it. Preferably, the plies above and below the central ply of the belt are folded so that the cords of two adjacent plies at opposite angles are continuous from one ply through the fold to the other ply. It is also preferred that the outermost belt ply have the cords at an angular direction opposite to the high modulus belt ply. The belt construction is also useful on a tire having the carcass cords extending at bias angles.

10 Claims, 3 Drawing Figures

PATENTED SEP 11 1973 3,757,843
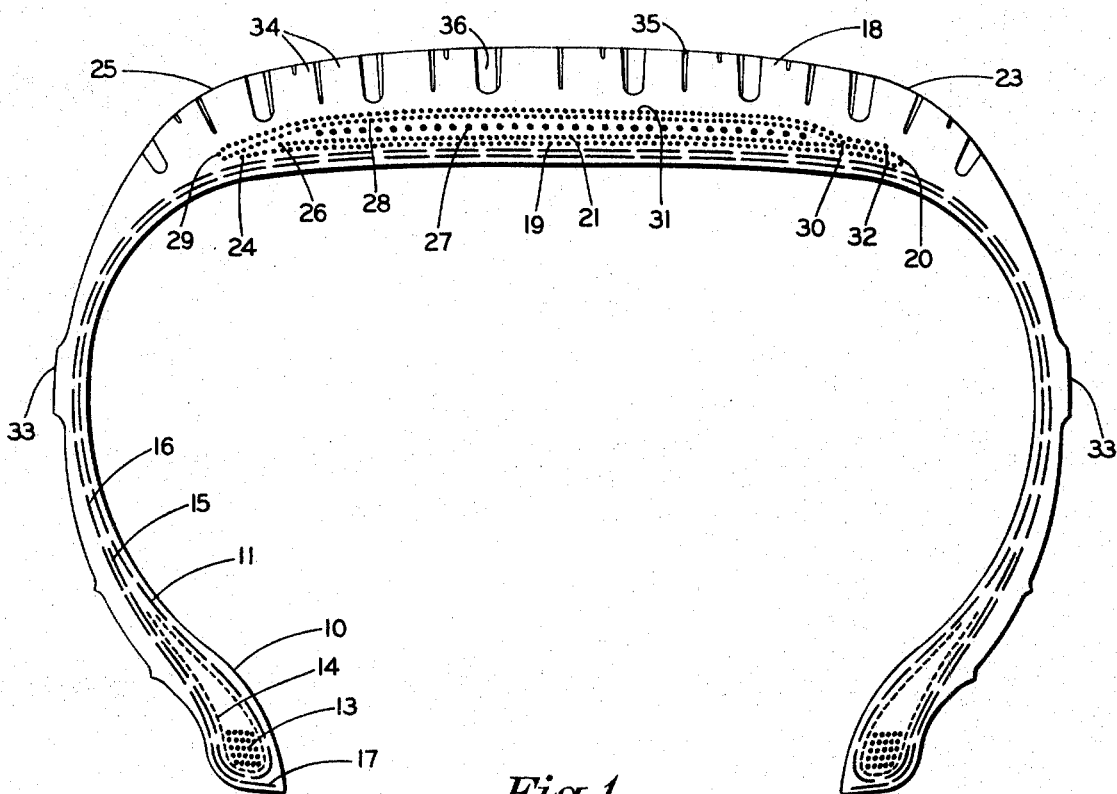
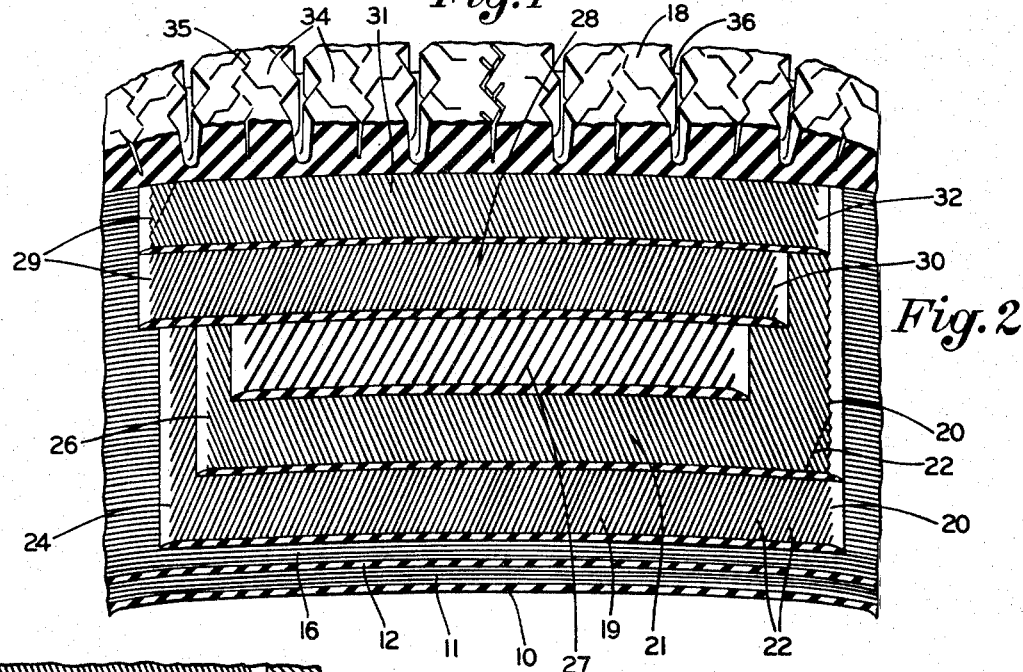
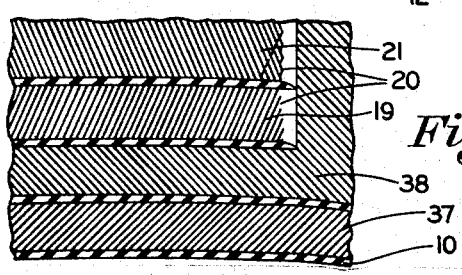
INVENTOR
ROBERT L. CARR
BY
W. A. Shira, Jr.
ATTORNEY

BELTED PNEUMATIC TIRE

BACKGROUND

Belted pneumatic tires have the advantage over tires without a peripheral belt under the tread in that they roll on the road surface with less squirming and friction and consequent better performance. Such belts are considered essential for radial cord tires to control the excessive lateral instability of radial cord carcasses.

Many constructions of belts for pneumatic tires have been proposed, and the few constructions which have gone into practical use have their benefits explained by various theories, which are at least somewhat contradictory. To the extent that theories of action have permitted predictions of performance, they have generally required tire designers to compromise between use of constructional features known to provide a particular performance benefit and other constructional features known to provide benefits apparently incompatible with the first.

The consequence is that tire designers have considered it necessary to design tires of different constructions depending on the conditions of use on particular kinds of motor vehicles intended for various different purposes. The resulting proliferation of types of tires is expensive and troublesome to manufacturers, dealers, and users.

SUMMARY OF THE INVENTION

I have found that a particular arrangement of the elements of a constricting peripheral belt provides an unexpectedly high level of performance of the tires, essentially equal to or significantly better than previously known belt constructions in every respect which has been examined. This eliminates the previously needed compromise in which one or more qualities of the tires are sacrificed in order to attain others considered more important for a particular condition of service.

This new belt construction is intended particularly for high performance radial cord pneumatic tires, but is advantageous also in other types of tires, including belted bias cord tires.

The belt of this invention is made up of a succession of plies of rubberized cords of high strength material arranged at small angles to the central plane so that they will be primarily circumferential in direction and capable of exerting a constricting force around the circumference of the tire under the tread. Some of these belt plies are placed in one angular direction with respect to the central plane and some at the opposite angular direction, and are preferably of a maximum width approximating the width of the tread.

The belt is particularly characterized by presence of a ply of cord material in the approximate center of the belt, consisting of material of substantially higher modulus than the remainder of the belt. Thus, this central ply may be made of steel cords having a modulus of 150 grams per denier (corresponding to about 10,650 kg/mm$^2$ on a volume basis or over with the remainder of the belt made of high strength rayon cords having a modulus less than that of the central ply and, preferably, 75 grams per denier (corresponding to about 1,080 kg/mm$^2$ on a volume basis or over.

The central ply of high modulus cords is also preferably made narrower than the plies of low modulus cords above and below it, but should extend over a substantial proportion of the width of the belt, such as from one-half to three-fourths of the maximum width of the belt.

It is not essential that there be only one ply of the high modulus cord, but a single ply will provide the desired improvements in performance. It is also not essential that there be any particular number of plies above and below the ply of high modulus cords, as long as there are enough cords to provide the required circumferential strength.

In the commonly used passenger car sizes of tires a convenient arrangement is for the belt to contain directly on the carcass a sheet of rubberized cords arranged at an angle of about 15° to 30° to the central plane and folded on itself so as to provide two plies connected by the fold along one edge. As is well known, the folding changes the direction of the cords so that the two plies will be at opposite angles. Over this pair of plies is placed a ply of rubberized cords of a higher modulus, also at a small angle which may be about 15° to 40° to the central plane, and with its angular direction opposite to that of the ply immediately under it. Above the high modulus cords is placed another pair of plies consisting of a folded sheet of rubberized cords like the first mentioned pair but with the fold on the opposite side of the tread, and preferably arranged so that the ply directly over the high modulus cords has the same angular direction as the high modulus cords, with the uppermost belt ply therefore at an opposite angle.

The remainder of the tire may be conventional in construction, including carcass plies anchored to inextensible beads designed for support on appropriately shaped flanges of the wheel rim, and a wear resisting tread over the belt with a tread pattern appropriate to the intended conditions of service.

THE DRAWINGS

In the accompanying drawings,

FIG. 1 is a cross section of a belted radial tire of this invention, and

FIG. 2 is a dissected view of the tread portion of the tire showing the placement of the several layers or plies of the tire.

FIG. 3 is a fragmentary view of a modification in which the new belt construction is combined with a bias cord carcass.

DETAILED DESCRIPTION

Referring to FIGS. 1 and 2, the tire illustrated is a tubeless passenger car tire with a 2-ply carcass of radial cords made of rayon, and having a height to width ratio of 70 hundredths.

The innermost layer of the tire is an essentially impervious liner 10 of butyl rubber or similar material extending over the entire inner surface and far enough around the beads on either side to assure sealing contact with the flanges of the rim.

Since this is a radial cord tire, the next layer is the first ply 11 of rubberized cords with each cord in a radial plane. In a radial section of a radial cord tire, such as is shown in FIG. 1, the sectioning cut will follow individual cords for considerable distances so that this ply is visible as substantial lengths of cord embedded in the rubberizing matrix 12. In the dissected view of FIG. 2, in which individual layers are removed one by one in a stepwise manner to expose the several constituent plies, all of the cords of the exposed portion of the first carcass ply 11 are visible.

The carcass cords in this tire are of high tenacity rayon of a conventional size such as 1650 denier 2 ply cords which are preferably subjected to the usual pretreatment with a resorcinol formaldehyde latex dip and heat set and dried under tension to ensure proper adhesion to the rubber matrix 12 and the best balance between strength and dynamic properties.

This first ply 11 is anchored to the beads by extending it under and outwardly around a bead ring on each side. Each bead ring contains a wire grommet 13 surrounded by the usual bead flipper 14 of rubberized fabric extending partly up the sidewall of the tire. Preferably the margin of the first ply 11 extends completely around the bead grommet 13 and flipper 14 with the margin 15 of ply 11 somewhat higher on the sidewall than the flipper.

In this instance, two carcass plies are present to obtain adequate strength. The second carcass ply 16 is identical with the first ply 11 except that it is not so wide. It is also a radial ply. It extends under the beads with the margin 17 near the toe of each bead.

The belt construction has a width approximating the width of the tread 18, although the various elements have their margins staggered so as to avoid concentrations of stress which might cause premature failure. For the same reason, it is preferred to have the portion of the belt which projects farthest toward each side be a folded edge rather than cut ends of cords.

The first belt ply 19 is a part of a width of rubberized cord material folded near its middle along fold line 20 so that the other part lying over it becomes the second belt ply 21, as can be seen in the radial section of FIG. 1 by following the double line formed by the cut ends of the cords in plies 19 and 21. In the dissected view of FIG. 2 the process of stepwise removal of layers results in cutting of the cords along the fold line 20 and removal of a portion of the upper fold which is the second belt ply 21 in order to expose the first belt ply 19. IN the actual structure, each cord, such as the individual cord 22, extends completely across the belt at the chosen bias angle, around the fold, and back across the belt at the same bias angle but at an opposite angular direction to the central plane of the tire. In this tire the cords of these belt plies are of high tenacity rayon such as that used in the carcass plies, and are similarly prepared and treated, except that the cords are somewhat larger, being made up of 3 plies of 1650 denier, and are cut and placed so as to be at a bias angle of about 20° in the finished, cured tire.

In preparing and placing the first two belt plies 19 and 21, the material, after bias cutting at the proper width and angle, is folded slightly off center so that the first belt ply 19 is slightly wider that the second belt ply 21. The folded material is placed so that the fold line 20 is under the shoulder 23 of the tread 18, and the margin 24 of the first belt ply 19 is somewhat short of the opposing shoulder 25. The margin 26 of the narrower ply 21 is then somewhat further short of the shoulder location.

This tire has a total number of five belt plies, and therefore the third belt ply 27 is the middle belt ply. It is made of high strength, high modulus, steel cords such as 5 strand cords of 0.010 inch diameter wire, pretreated for rubber to metal adhesion and embedded in a rubber matrix of substantial thickness, such as 0.05 to 0.06 inch, to assure freedom of direct contact of the high modulus steel cords with the lower modulus rayon cords. In the presently preferred embodiment, the modulus of the rubber matrix is higher than that employed in the rubber covering of the carcass cords. Because of their high strength these steel cords can be spaced about twice as far apart as the rayon cords in the other plies, suitably about 8 ends per inch. The bias angle may be the same as that of the other belt plies but is preferably slightly greater because of the greater stiffness of the steel, and in this instance is about 28° in the cured tire.

It is also preferred that the middle belt ply 27 be substantially narrower than the plies below and above so as to minimize concentrations of stress at its margins. In this case it is approximately 60 percent of the total width of the belt, with its margins closer to the central plane of the belt than any of the margins of the other belt plies.

The remaining belt plies are identical with the first and second belt plies except that the fold is on the other side, and the narrower ply is next to the middle ply of high modulus cords. Thus, in this instance, the fourth belt ply 28 has its fold line 29 under the shoulder 25 of the tread 18 opposite to fold line 20, and has its margin 30 in a position between the margin of the steel cord middle belt ply 27 and the fold line 20 of the lower belt plies 19 and 21. The fifth belt ply 31, being slightly wider than the fourth belt ply 28, covers the margin 30 of the latter and has its own margin 32 just short of fold line 20 of the lower belt plies. Thus the middle belt ply 27 is completely enclosed, above, below, and on both sides, by the remaining belt plies.

Since it is desirable, for the purpose of achieving a satisfactorily balanced construction, for the uppermost belt ply, which in this case is the fifth belt ply 31, to have an opposite angle to the relatively stiff middle belt ply 27 of strong high modulus steel cords, it follows that the fourth belt ply 28 is at an opposite angle to the fifth belt ply 31 and has an angle in the same direction as that of the middle belt ply 27 although slightly different in magnitude.

The tire is completed by application of wear resisting surfacing material such as sidewall cover and tread rubber, which may be supplied as a single unit, or for convenience may be subdivided into filler strips to occupy the space on either side of the belt, sidewall covers extending from the beads to the shoulders, and a tread slab from one shoulder to the other, as is usual. The tire is molded to the desired shape which may include scuffing ribs 33,33 on the sidewalls and a suitable pattern of tread ribs or blocks 34 separated by molded slits 35 and grooves 36.

Tires of this construction have been found to exhibit increases in resistance to wear and injury compared to other commercially available types of tires including the most expensive and complex tires previously thought to be the most advanced and best performing tires. Thus these new tires have shown over 10 percent higher performance in the bruise energy test over radial cord tires with all-steel belts which had previously ranked highest. They also show 10 percent improvement in tread wear compared to the best previously available radial cord tires which in turn are far better than bias cord tires in this respect. In respect to high speed operation they rank highest again, better than the next best all rayon tire in the high speed indoor test, operating for a 45 percent greater mileage and at a terminal speed nearly 15 percent higher than tires with all steel belts. In all other respects examined, these tires were either superior, or equal, or nearly equal to other available kinds of tires. These unexpectedly favorable results may be connected in some way with the fact that the road pressure over the "footprint" of the tire is nearly uniform instead of being much higher at the shoulders than at the center of the tread as is the case with the tires now in common use.

It is consequently no longer necessary to sacrifice some important quality in order to achieve a desired high level of performance of another kind, as had been considered to be necessary heretofore. This quite unexpected result eliminates the need for design, manufacture, stocking, purchase, and mounting of different types of tires for different kinds of service, with all the costs and inconveniences which that has entailed up to now.

Although this invention has been described with reference to a specific construction of tire in a passenger car size, it can be embodied in other sizes for almost any kind of vehicle. It can also be used with other cord types than the presently preferred combination of high tenacity rayon for the lower and upper belt plies and steel for the middle ply. Thus, the high modulus cords of the middle ply may be made of glass, or may even be certain high modulus cord constructions of organic substances, when combined with lower and upper belt plies of significantly lower modulus cords which, in addition to rayon cords may include those made of 66 nylon.

Somewhat different arrangements of the belt plies are also possible. This if strength requirements permit use of a three ply belt, the first belt ply could be rayon cords at a small angle in one direction, the second belt ply steel cords at a small angle preferably in the same direction, and the third belt ply of rayon like the first but with the cords at an angle opposite to both the first belt ply and the steel cord middle ply.

Although it is now preferred that the uppermost belt ply have its cords at an angular direction opposite to those of the middle ply of high modulus cords, this is not essential particularly if there are five or more plies in the belt. In such situations, it may be satisfactory for each belt ply to be at an opposite angular direction to the belt ply immediately above and below.

The invention is also not limited to radial cord tires. As shown in the fragmentary view in FIG. 3 a bias belted tire can be made by combining a conventional bias cord carcass with the new belt construction described above. In this combination an inner liner 10 of the kind previously described is attached to a conventional bias cord carcass consisting of rubberized cords of nylon, rayon, polyester or the like. In this instance, a two ply carcass is used, having the first carcass ply 37, of high tenacity rayon cords which are 1,650 denier 3 ply cords, at a bias angle of about 40°, and the second carcass ply 38 at the same bias angle and the opposite angular direction. These carcass plies are anchored to the beads in the same manner as the radial plies in FIG. 1

The belt is identical in construction to that shown in FIG. 1, and FIG. 3 therefore shows only a portion of its construction, namely the first belt ply 19 which is one piece with the second belt ply 21 with a fold line 20. The remaining structure, including the middle belt ply 27, the fourth and fifth belt plies 28 and 31, and the tread and sidewalls, is not shown since it is all identical with the radial tire construction already described in detail.

Because of the simplicity of its design, this new type of tire can be built easily and cheaply either by the one step method in which the carcass plies with liner (if a tubeless tire is being built) are assembled with the bead components and are provided with the belt plies and the sidewall covers and tread rubber on a single machine, or by the two step method in which the belt is separately assembled and the pre-assembled carcass is expanded into it. The materials include a minimum quantity of high cost components and the structural arrangement permits rapid and economical manufacture, so that the new invention results in superlative performance at an unusually economical overall cost.

I claim:

1. A belted pneumatic tire comprising a carcass reinforced with cords lying approximately in radial planes, a wear resisting tread, and a belt having approximately the same width as the tread located between the carcass and the tread, the belt comprising a middle belt ply of high modulus cords and other belt plies of lower modulus cords above and below the middle belt ply, all extending across the major part of the width of the belt, with at least some of the other belt plies projecting laterally beyond the middle belt on each side, the cords of the middle belt ply having a modulus on a volume basis which is at least twice the modulus of the cords of the other belt plies, and the cords of the other belt plies having a modulus on a volume basis not less than of the order of the modulus of rayon cords, the cords of all of the belt plies being at a small angle to the central plane with the cords of some of the belt plies being at one angular direction with respect to the central plane and the cords of the remaining belt plies being at the opposite angular direction.

2. A tire as in claim 1 in which the radially outermost belt ply is at the opposite angular direction from the middle belt ply of high modulus cords.

3. A tire as in claim 1 in which the cords of the carcass are radial cords.

4. A tire as in claim 3 in which the radially outermost belt ply is at the opposite angular direction from the middle belt ply of high modulus cords.

5. A tire as in claim 3 in which the middle belt ply is of steel cords and the other belt plies are of rayon cords.

6. A tire as in claim 3 in which the other belt plies project laterally beyond the middle belt ply above and below and on each side.

7. A tire as in claim 3 in which a pair of belt plies located radially inward of the middle belt ply is of one piece and has a circumferential fold located approximately below one shoulder of the tread, and a pair of belt plies located radially outward of the middle belt ply is of one piece and has a circumferential fold located approximately below the other shoulder of the tread.

8. A tire as in claim 7 in which the middle belt ply is of steel cords, the other belt plies are of rayon cords and project laterally beyond the middle belt ply above and below and on each side, and the radially outermost belt ply is at the opposite angular direction from the middle belt ply.

9. A tire as in claim 8 in which the laterally outermost projections of the belt on each side are the folds in the pairs of belt plies located radially inward and radially outward of the middle belt ply 10. A belted pneumatic tire comprising a radial cord reinforced carcass, a wear resisting tread, and a belt having approximately the same width as the tread located between the carcass and the tread, the belt consisting of a ply of metallic cords with the individual cords extending parallel to each other and at an angle of about 15° to 40° to the central plane of the tire, a pair of textile cord plies radially inwardly and a pair of textile cord plies radially outwardly of the ply of metallic cords with the individual textile cords extending parallel each other and at an angle of about 15° to 30° to the central plane of the tire, each pair of textile cord plies being of one piece with a circumferential fold at about the center of its width, the folded edge of one pair of textile cord plies being the laterally outermost edge of the belt on one side and the folded edge of the other pair being the outermost edge of the belt on the other side, an opposing edge of a textile cord ply being laterally outward of an edge of the ply of metallic cords and inward of the folded edge of the other pair of textile cord plies on each side, with the angular direction of the outermost textile cord ply opposite to the angular direction of the ply of metallic cords.

* * * * *